United States Patent
Zhu (10) Patent No.: US 10,567,507 B2
(45) Date of Patent: Feb. 18, 2020

(54) MESSAGE PROCESSING METHOD AND APPARATUS, AND MESSAGE PROCESSING SYSTEM

(71) Applicant: Huawei Technologies Co., Ltd., Shenzhen (CN)

(72) Inventor: Jian Zhu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 368 days.

(21) Appl. No.: 15/481,962

(22) Filed: Apr. 7, 2017

(65) Prior Publication Data

US 2017/0214742 A1 Jul. 27, 2017

Related U.S. Application Data

(63) Continuation of application No. PCT/CN2015/076985, filed on Apr. 20, 2015.

(30) Foreign Application Priority Data

Oct. 8, 2014 (CN) .......................... 2014 1 0528631

(51) Int. Cl.
*H04L 29/08* (2006.01)
*G06F 11/14* (2006.01)
(Continued)

(52) U.S. Cl.
CPC ...... *H04L 67/1097* (2013.01); *G06F 9/45558* (2013.01); *G06F 9/542* (2013.01);
(Continued)

(58) Field of Classification Search
CPC ............ H04L 67/1097; H04L 67/1095; H04L 67/322; H04L 2029/06054; G06F 11/1456;
(Continued)

(56) References Cited

U.S. PATENT DOCUMENTS 8,615,584 B2 12/2013 Dawson et al.
2003/0037283 A1 2/2003 Srinivasan et al.
(Continued)

FOREIGN PATENT DOCUMENTS

CN 103368993 A 10/2013
CN 103501290 A * 1/2014
(Continued)

OTHER PUBLICATIONS

Foreign Communication From a Counterpart Application, Chinese Application No. 201410528631.0, Chinese Office Action dated Mar. 16, 2018, 6 pages.
(Continued)

*Primary Examiner* — Chris Parry
*Assistant Examiner* — Weiwei Y Stiltner
(74) *Attorney, Agent, or Firm* — Conley Rose, P.C.

(57) ABSTRACT

A message processing method and apparatus on a cloud computing platform, and a message processing system on a cloud computing platform are provided. In the message processing method, after an input request message sent to an active server and a standby server is received, the input request message is sent to all active servers and standby servers. After input response messages returned by the active server and the standby server are received, one of the input response messages is sent to an external device.

20 Claims, 5 Drawing Sheets

(51) Int. Cl.
*G06F 9/455* (2018.01)
*G06F 9/54* (2006.01)
*H04L 29/06* (2006.01)

(52) U.S. Cl.
CPC .......... *G06F 11/14* (2013.01); *G06F 11/1456* (2013.01); *H04L 67/1095* (2013.01); *H04L 67/322* (2013.01); *G06F 2009/45591* (2013.01); *H04L 2029/06054* (2013.01)

(58) Field of Classification Search
CPC ................. G06F 9/45558; G06F 9/542; G06F 2009/45591
USPC ........................................................ 709/204
See application file for complete search history.

(56) References Cited

U.S. PATENT DOCUMENTS

| | | | |
|---|---|---|---|
| 2008/0126833 A1* | 5/2008 | Callaway | G06F 11/1641 714/6.1 |
| 2010/0004930 A1 | 1/2010 | Strope et al. | |
| 2013/0007759 A1* | 1/2013 | Krishnamurthy | G06F 9/50 718/104 |
| 2013/0030928 A1* | 1/2013 | Lopez | G06Q 30/02 705/14.69 |
| 2013/0311520 A1* | 11/2013 | Nakagawa | G06F 3/0607 707/812 |
| 2015/0172760 A1* | 6/2015 | Abiezzi | H04N 21/4437 725/39 |
| 2016/0286001 A1* | 9/2016 | Chan | H04L 12/6418 |
| 2016/0323427 A1 | 11/2016 | Guan et al. | |

FOREIGN PATENT DOCUMENTS

| | | |
|---|---|---|
| CN | 103532764 A | 1/2014 |
| CN | 103761166 A | 4/2014 |
| CN | 103885857 A | 6/2014 |
| EP | 2838085 A1 | 2/2015 |
| WO | 2013154010 A1 | 10/2013 |
| WO | 2013158514 A1 | 10/2013 |

OTHER PUBLICATIONS

Machine Translation and Abstract of Chinese Publication No. CN103368993, dated Oct. 23, 2013, 5 pages.
Machine Translation and Abstract of Chinese Publication No. CN103532764, dated Jan. 22, 2014, 15 pages.
Machine Translation and Abstract of Chinese Publication No. CN103885857, dated Jun. 25, 2014, 17 pages.
Foreign Communication From a Counterpart Application, European Application No. 15848459.2, Partial Supplementary European Search Report dated Jun. 21, 2017, 15 pages.
Foreign Communication From a Counterpart Application, PCT Application No. PCT/CN2015/076985, English Translation of International Search Report dated Jul. 2, 2015, 2 pages.
Foreign Communication From a Counterpart Application, PCT Application No. PCT/CN2015/076985, English Translation of Written Opinion dated Jul. 2, 2015, 7 pages.
Foreign Communication From a Counterpart Application, European Application No. 15848459.2, European Office Action dated Jun. 3, 2019, 9 pages.

* cited by examiner

FIG. 8

MESSAGE PROCESSING METHOD AND APPARATUS, AND MESSAGE PROCESSING SYSTEM

CROSS-REFERENCE TO RELATED APPLICATIONS

This application is a continuation application of International Patent Application No. PCT/CN2015/076985, filed on Apr. 20, 2015, which claims priority to Chinese Patent Application No. 201410528631.0, filed on Oct. 8, 2014. The disclosures of the aforementioned applications are hereby incorporated by reference in their entireties.

TECHNICAL FIELD

The present disclosure relates to the field of communications technologies, and in particular, to a message processing method and apparatus on a cloud computing platform, and a message processing system on a cloud computing platform.

BACKGROUND

A telecommunication service such as a call service or a charging service has an extremely high requirement for reliability, which reaches five 9s (99.999%), and is far greater than enterprise-level reliability. According to materials that are currently disclosed, reliability of a cloud computing system is about 95% to 98%, which is far less than a reliability requirement of a telecommunication service. However, as cloudification is a megatrend, how to continue keeping telecommunication-level reliability of a telecommunication service after migrating the telecommunication service to cloud is a technical problem that needs to be resolved.

For a software service, an important means for improving reliability is a two-node cluster in hot standby mode. The prior art provides a dual-server cloudification solution. According to the solution, dual servers (for example, an active server and a standby server) are separately deployed on a cloud end. The active server executes an external request and performs synchronization with the standby server after executing the external request. A synchronization process includes data synchronization and status synchronization.

However, in the dual-server cloudification solution provided in the prior art, dual-server standby reliability reduces when a volume of data requiring synchronization is relatively great, resulting in an obvious delay of dual-server switch, and further reducing service reliability.

SUMMARY

Embodiments of the present disclosure provide a message processing method and apparatus and a message processing system, to improve standby reliability in a dual-server standby scenario.

According to a first aspect, an embodiment of the present disclosure provides a message processing method on a cloud computing platform, including receiving an input request message, and sending the request message to an active server and a standby server that are deployed on the cloud computing platform, where a same application program runs on the active server and the standby server; and receiving multiple input response messages returned by the active server and the standby server and sending one of the input response messages.

With reference to the first aspect, in a first possible implementation manner, the receiving multiple input response messages returned by the active server and the standby server and sending one of the input response messages includes receiving the multiple input response messages returned by the active server and the standby server, and sending a response message that first arrives; or receiving the multiple input response messages returned by the active server and the standby server, where the input response messages carry response results, determining first-type input response messages corresponding to a response result that appears repeatedly for maximum times, and sending one input response message of the first-type input response messages; or receiving the multiple input response messages returned by the active server and the standby server, where the input response messages carry response results, and when the response results of the multiple input response messages are all different, selecting and sending an input response message of a predefined active server or standby server; or receiving the multiple input response messages returned by the active server and the standby server, and sending an input response message returned by a virtual machine with a maximum health degree in the active server and the standby server.

With reference to the first possible implementation manner of the first aspect, in a second possible implementation manner, the method further includes updating a health degree of the active server and a health degree of the standby server according to the received input response messages, where the health degree of the active server and the health degree of the standby server are obtained by computing quantities of input response messages that carry correct response results and that are separately sent by the active server and the standby server.

With reference to the first aspect, the first possible implementation manner of the first aspect, or the second possible implementation manner of the first aspect, in a third possible implementation manner, the method further includes receiving multiple output request messages sent by the active server and the standby server and sending one of the output request messages; and receiving an output response message, and sending the output response message to the active server and the standby server.

With reference to the first aspect, the first possible implementation manner of the first aspect, the second possible implementation manner of the first aspect, or the third possible implementation manner of the first aspect, in a fourth possible implementation manner, the method further includes receiving multiple storage access requests sent by the active server and the standby server, and sending one of the storage access requests to an Infrastructure as a Service (IaaS) layer storage device shared by the active server and the standby server; and receiving a storage access response returned by the IaaS layer storage device, and sending the storage access response to the active server and the standby server.

According to a second aspect, an embodiment of the present disclosure provides a message processing apparatus on a cloud computing platform, including an input message processing unit configured to receive an input request message and send the request message to an active server and a standby server that are deployed on the cloud computing platform, where the active server and the standby server are configured to implement dual-server standby, and a same application program runs on the active server and the standby server; and an input response processing unit configured to receive multiple input response messages returned by the active server and the standby server and send one of the input response messages.

With reference to the second aspect, in a first possible implementation manner, the receiving, by the input response processing unit, multiple input response messages returned by the active server and the standby server and sending one of the input response messages includes receiving, by the input response processing unit, the multiple input response messages returned by the active server and the standby server, and sending a response message that first arrives; or receiving, by the input response processing unit, the multiple input response messages returned by the active server and the standby server, where the input response messages carry response results, determining first-type input response messages corresponding to a response result that appears repeatedly for maximum times, and sending one input response message of the first-type input response messages; or receiving, by the input response processing unit, the multiple input response messages returned by the active server and the standby server, where the input response messages carry response results, and when the response results of the multiple input response messages are all different, selecting and sending an input response message of a predefined active server or standby server; or receiving, by the input response processing unit, the multiple input response messages returned by the active server and the standby server, and sending an input response message returned by a virtual machine with a maximum health degree in the active server and the standby server.

With reference to the second aspect or the first possible implementation manner of the second aspect, in a second possible implementation manner, the apparatus further includes an output message processing unit configured to receive the multiple output request messages sent by the active server and the standby server and send one of the output request messages; and an output response processing unit configured to receive an output response message, and send the output response message to the active server and the standby server.

With reference to the second aspect, the first possible implementation manner of the second aspect, or the second possible implementation manner of the second aspect, in a third possible implementation manner, the apparatus further includes: a storage message processing unit configured to receive multiple storage access requests sent by the active server and the standby server, and send one of the storage access requests to an IaaS layer storage device shared by the active server and the standby server; and a storage response processing unit configured to receive a storage access response returned by the IaaS layer storage device and send the storage access response to the active server and the standby server.

According to a third aspect, an embodiment of the present disclosure further provides a message processing system on a cloud computing platform, including an active server and a standby server that are deployed on the cloud computing platform, and further including the message processing apparatus according to the second aspect.

The message processing method on a cloud computing platform provided in the embodiments of the present disclosure includes after receiving an input request message sent to an active server and a standby server, sending the input request message to all active servers and standby servers; and after receiving input response messages returned by the active server and the standby server, sending one of the input response messages. As compared with the prior art, in the embodiments of the present disclosure, an input request is sent to all active servers and standby servers for execution and the active servers and the standby servers execute the same input request. Therefore, data synchronization and status synchronization do not need to be performed between the active servers and the standby servers, so that stability of dual-server standby is improved, and a dual-server switch speed is further improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
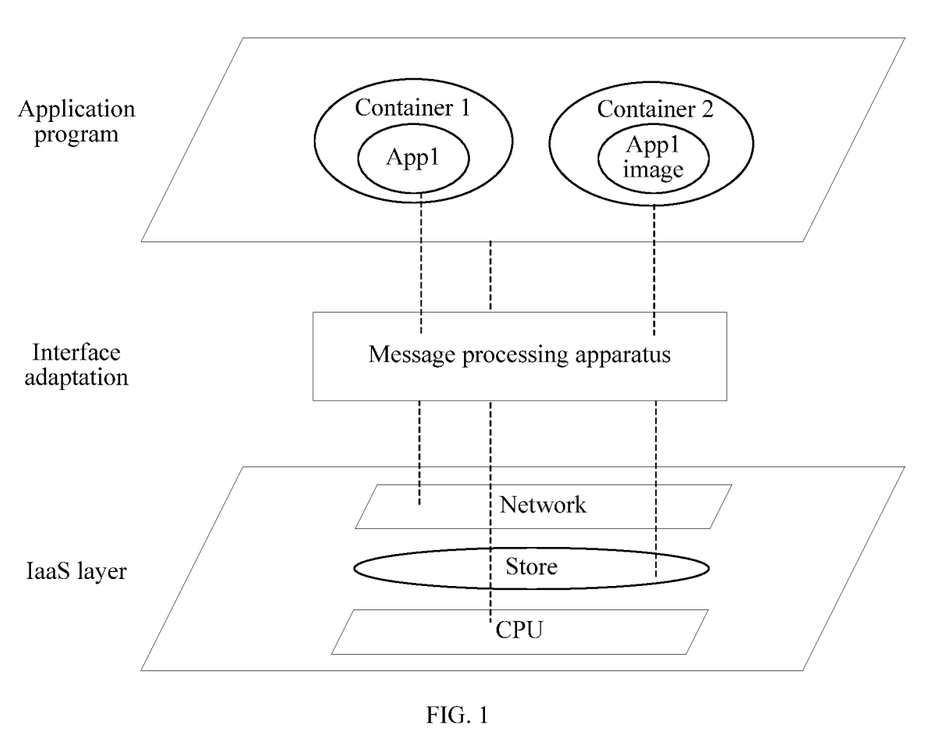
FIG. 1 is a schematic diagram of deployment of an active server and a standby server according to an embodiment of the present disclosure.

The present disclosure provides a message processing method and apparatus on a cloud computing platform, and a message processing system on a cloud computing platform. Referring to FIG. 1, FIG. 1 is a schematic diagram of deployment of an active server and a standby server according to an embodiment of the present disclosure.

As shown in the figure, the active server and the standby server are virtual machines (which may also be referred to as virtualization containers) deployed on the cloud computing platform, and a same application runs on the active server and the standby server. An application program (for example, App1) runs in a virtualization container 1 as an active server, and an image of the application program (for example, App1 image) runs in a virtualization container 2 as a standby server. A quantity of standby servers may be flexibly increased according to requirements. The concepts of the active server and the standby server are relative. All the virtual machines may be referred to as active servers, or all the virtual machines may be referred to as standby servers.

The virtualization container 1 and the virtualization container 2 use network resources, storage resources, and computation resources in a central processing unit (CPU) of a IaaS layer (also referred to as layer-I in the disclosure) of cloud computing. The virtualization container 1 and the virtualization container 2 may share same network resources and storage resources, or may use independent network resources and storage resources. A message processing apparatus (which may also be understood as an interface adaptation layer) is also included between the application program and the IaaS layer.

Figure 2:
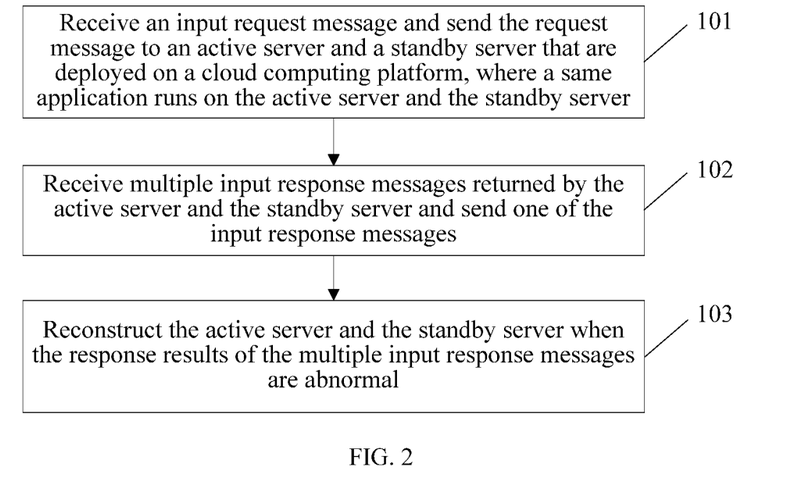
FIG. 2 is a flowchart of a message processing method according to Embodiment 1 of the present disclosure.

Referring to FIG. 2, FIG. 2 is a flowchart of a message processing method on a cloud computing platform according to Embodiment 1 of the present disclosure.

As shown in the figure, the message processing method on a cloud computing platform mainly includes:

Step 101: Receive an input request message, and send the request message to an active server and a standby server that are deployed on a cloud computing platform, where a same application program runs on the active server and the standby server.

In this embodiment of the present disclosure, when receiving an input request message such as a charging request from an external device ("the external device" refers to an external device except the active server and the standby server), a message processing apparatus duplicates and sends the request message to the active server and the standby server. The active server and the standby server independently execute the input request message, and return corresponding input response messages.

The received input request message may be sent to the active server and/or the standby server, or may be sent to the message processing apparatus, that is, a destination address of the input request message may be the active server and/or the standby server, or the message processing apparatus in this embodiment. The message processing apparatuses may also receive the input request message. The active server and the standby server may have a same address, or may have addresses independent of each other.

Step 102: Receive multiple input response messages returned by the active server and the standby server, and send one of the input response messages.

In this embodiment of the present disclosure, after receiving the multiple input response messages returned by the active server and the standby server, the message processing apparatus may identify duplicate input response messages and send one of the input response messages.

Further, in this embodiment of the present disclosure, the multiple input response messages returned by the active server and the standby server may be received, and a response message that first arrives is sent, so as to improve the message sending efficiency. After the response message that first arrives is sent, a message that is a duplicate of the input response message that is first returned may further be quickly identified according to a message feature such as, for example, a session identifier (session-id) of the input response message and be discarded. The message processing apparatus may also identify, by means of complete message matching, the input response messages sent by the active server and the standby server.

In this embodiment of the present disclosure, alternatively, the multiple input response messages returned by the active server and the standby server may be received, where the input response messages carry response results. In this embodiment of the present disclosure, first-type input response messages corresponding to a response result that appears repeatedly for maximum times are determined, and one input response message of the first-type input response messages is sent, so as to further improve correctness for sending the response message. It should be noted that the response result may be included in a message body of the response message, or may be directly the response message.

In this embodiment of the present disclosure, alternatively, the multiple input response messages returned by the active server and the standby server may be received, where the input response messages carry response results, and when it is determined that the response results of the multiple input response messages are all different, an input response message of a predefined active server or standby server is selected and sent, that is, an input response message of a virtual machine specified in advance is selected preferentially and sent.

A specific process for processing the multiple input response messages returned by the active server and the standby server in this embodiment of the present disclosure may be applicable to the following other embodiments in Embodiment 1 of the present disclosure.

In this embodiment of the present disclosure, in order to enable the message processing apparatus to receive all input request messages sent to the active server and the standby server, the message processing apparatus may be configured to a routing node that must be passed through. The message processing apparatus may intercept the input request message sent to the active server and the standby server and intercept the multiple input response messages returned by the active server and the standby server.

In this embodiment of the present disclosure, if the received input request message carries a globally unique message feature such as, for example, a session-id, the message processing apparatus may identify duplicate input response messages according to the message feature, and may match the input request message with the input response message according to the message feature. The specific description of the message feature may be applicable to the following other embodiments in Embodiment 1 of the present disclosure.

If the input request message received by the message processing apparatus does not carry a globally unique message identifier, the message processing apparatus may add some related information in the input request message to be sent, for example, add an identifier (ID) of each virtual machine such as, for example, a process ID of a virtual machine or a Media Access Control (MAC) address of a virtual machine and a sequence number to an input request message sent to the virtual machine, and then send the modified input request message to the active server and the standby server. The sequence number may correspond to an input request message. In this embodiment of the present disclosure, related information may be added to an interface layer of a layer I, so as to facilitate the message processing apparatus to perform identification. Correspondingly, because the related information is added to the input request message to be sent, an input response message to be returned also carries the related information. The message processing apparatus may identify duplicate input response messages according to a sequence number in related information, and identify, according to virtual machine identifiers in related information, input response messages returned by different virtual machines, and may also match the input request message with the input response message according to the related information. Because the foregoing related information is added to the interface layer of the layer I, the message processing apparatus may not add the related information when sending the input request message to the active server and the standby server.

Step 103: Reconstruct the active server and the standby server when response results of the multiple input response messages are abnormal.

In this embodiment of the present disclosure, if the response results of the multiple input response messages are abnormal, for example, the response results of the multiple input response messages are all different or response results of only some response messages of the multiple input response messages are different, that is, response results of other input response messages are the same, it indicates that some virtual machines in the active server and the standby server may have faults. In this case, the active server and the standby server are reconstructed. The active server and the standby server may be reconstructed according to a predefined rule (for example, reinstalling an application program or restoring data), so that the active server and the standby server are restored.

In addition, in this embodiment of the present disclosure, when the first-type input response messages corresponding to a response result that appears repeatedly for maximum times are determined, active servers or standby servers except virtual machines corresponding to the first-type input response messages are reconstructed according to the virtual machines corresponding to the first-type input response messages, so that the active servers or standby servers except for the virtual machines corresponding to the first-type input response messages are restored. Meanwhile, a quantity of virtual machines to be reconstructed is reduced, and the standby reliability is indirectly improved.

Further, the active server and the standby server in this embodiment of the present disclosure may further respectively correspond to a health degree (or reliability). The health degree is determined according to a proportion of a quantity of correct input response messages returned to a quantity of total input response messages returned.

In this embodiment of the present disclosure, after the input response messages returned by the active server or by the standby server are received, whether the input response messages are correct is determined, and the health degree of the corresponding active server and the health degree of the corresponding standby server are updated according to a determining result. For example, if the input response message is correct, the health degree increases. Further, when an input response message is sent, an input response message returned by a virtual machine with a high health degree is sent. A process of determining whether the input response messages are correct may be based on a principle that the minority is subordinate to the majority. For example, a quantity of times a response result in each input response message appears is counted, an input response message corresponding to a response result that appears for maximum times is determined to be correct, and other response results are determined to be wrong. The specific description of the health degree of the active server and the health degree of the standby server in this embodiment of the present disclosure may be applicable to the following other embodiments in Embodiment 1 of the present disclosure. In addition, in this embodiment of the present disclosure, when the health degree of the active server or the health degree of the standby server is less than a threshold, the active server or the standby server with the health degree being less than the threshold is reconstructed. For example, the virtual machine is reconstructed according to a predefined rule, or the active server or the standby server with the health degree being less than the threshold is reconstructed according to a virtual machine with a maximum health degree.

Figure 3:
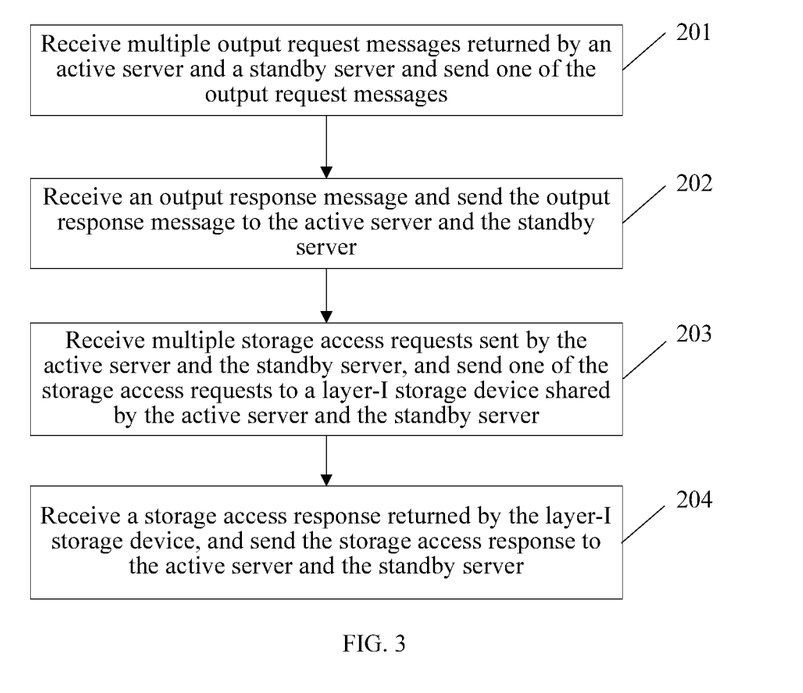
FIG. 3 is a flowchart of a message processing method according to Embodiment 2 of the present disclosure.

Referring to FIG. 3, FIG. 3 is a flowchart of a message processing method on a cloud computing platform according to Embodiment 2 of the present disclosure.

As shown in the figure, the message processing method on a cloud computing platform includes:

Step 201: Receive multiple output request messages returned by an active server and a standby server and send one of the output request messages.

Further, the active server that operates an application program and the standby server that operates an application program send output request messages, for example, send a location request message to a terminal. In this embodiment of the present disclosure, after the output request messages are received, one of the output request messages is sent, for example, an output request message that is received first is sent.

In this embodiment of the present disclosure, duplicate output request messages are identified according to a message feature of an output request message, for example, the duplicate output request messages are identified according to a session-id. In addition, the active server and the standby server may add, to an output request message sent to a message processing apparatus, a sequence number of the message, and the message processing apparatus quickly identifies a duplicate output request message according to the sequence number.

In this embodiment of the present disclosure, in order to enable the message processing apparatus to receive all the output request messages sent by the active server or the standby server, the message processing apparatus may be configured to a routing node that must be passed through, and the message processing apparatus may intercept all the output request messages sent by the active server and the standby server.

Step 202: Receive an output response message and send the output response message to the active server and the standby server.

Further, in this embodiment of the present disclosure, after an output response message such as a location response message returned by the external device is received, the received location response message is sent to the active server and the standby server. The active server and the standby server perform data processing according to the received output response message. In this embodiment of the present disclosure, a processing result may further be stored after data processing is performed, that is, the active server and the standby server send a storage access request to a layer-I storage device.

The message processing apparatus may send an output response message to the active server and the standby server according to a locally stored routing table, or broadcast the output response message to the active server and the standby server.

It should be noted that the output request message in Embodiment 2 of the present disclosure may be an output request message actively triggered by the active server and the standby server, or may be an output request message returned by the active server and the standby server according to the input request message received in Embodiment 1, and in this case, the input response message returned by the active server and the standby server is the output request message. In the message processing method of Embodiment 1, after step 102 of sending one of the input response messages is executed, step 202 of receiving an output response message is also executed.

Step 203: Receive multiple storage access requests sent by the active server and the standby server, and send one of the storage access requests to a layer-I storage device shared by the active server and the standby server.

In this embodiment of the present disclosure, the active server and the standby server share a same layer-I storage device. Therefore, when the multiple storage access requests (for example, storage access requests returned according to the output response messages) sent by the active server and the standby server are received, one of the storage access requests is sent to the shared layer-I storage device, for example, a storage access request that first arrives is sent. In addition, the message processing apparatus may also send a storage access request of a virtual machine with a maximum health degree.

In this embodiment of the present disclosure, if the storage access request carries a message feature, the message processing apparatus identifies duplicate storage access requests according to the message feature. In addition, the active server and the standby server may also add a sequence number of the access request to the sent storage access request, and the message processing apparatus quickly identifies duplicate storage access requests according to the sequence number. The foregoing sequence number may be added to an interface layer of the layer I, so as to facilitate the message processing apparatus to perform identification.

In this embodiment of the present disclosure, if the active server and the standby server do not share the same layer-I storage device, that is, the active server and the standby server are configured with independent storage devices, and in this case, the active server and the standby server separately send a storage access request to a corresponding storage device and receive a storage access response, and the message processing apparatus does not process the storage access request.

Step 204: Receive a storage access response returned by the layer-I storage device, and send the storage access response to the active server and the standby server.

In this embodiment of the present disclosure, after the storage access response returned by the layer-I storage device is received, a corresponding storage access request is matched according to the message feature or the sequence number of the storage access response, and then the storage access response is duplicated and sent to the active server and the standby server, so that the active server and the standby server obtain a storage access result.

In the message processing method on a cloud computing platform provided in this embodiment of the present disclosure, after output request messages sent by an active server and a standby server are received, one of the output request messages is sent. After an output response message returned by an external device is received, the output response message is duplicated and sent to the active server and the standby server. As compared with the prior art, in this embodiment of the present disclosure, the output response message is sent to all active servers and standby servers, and the active servers and the standby servers execute the same output response message. Therefore, data synchronization and status synchronization do not need to be performed between the active servers and the standby servers, so that stability of dual-server standby is improved, and a dual-server switch speed is further improved.

Further, in this embodiment of the present disclosure, after storage access requests are received, one of the storage access requests is sent to a shared layer-I storage device, and a received storage access response is sent to all the active servers and the standby servers, so as to implement access of the shared storage device. As compared with the prior art, the active server and the standby server in this embodiment of the present disclosure may share a layer-I storage device, so as to reduce redundancy of storage resources in a dual-server standby scenario.

Figure 4:
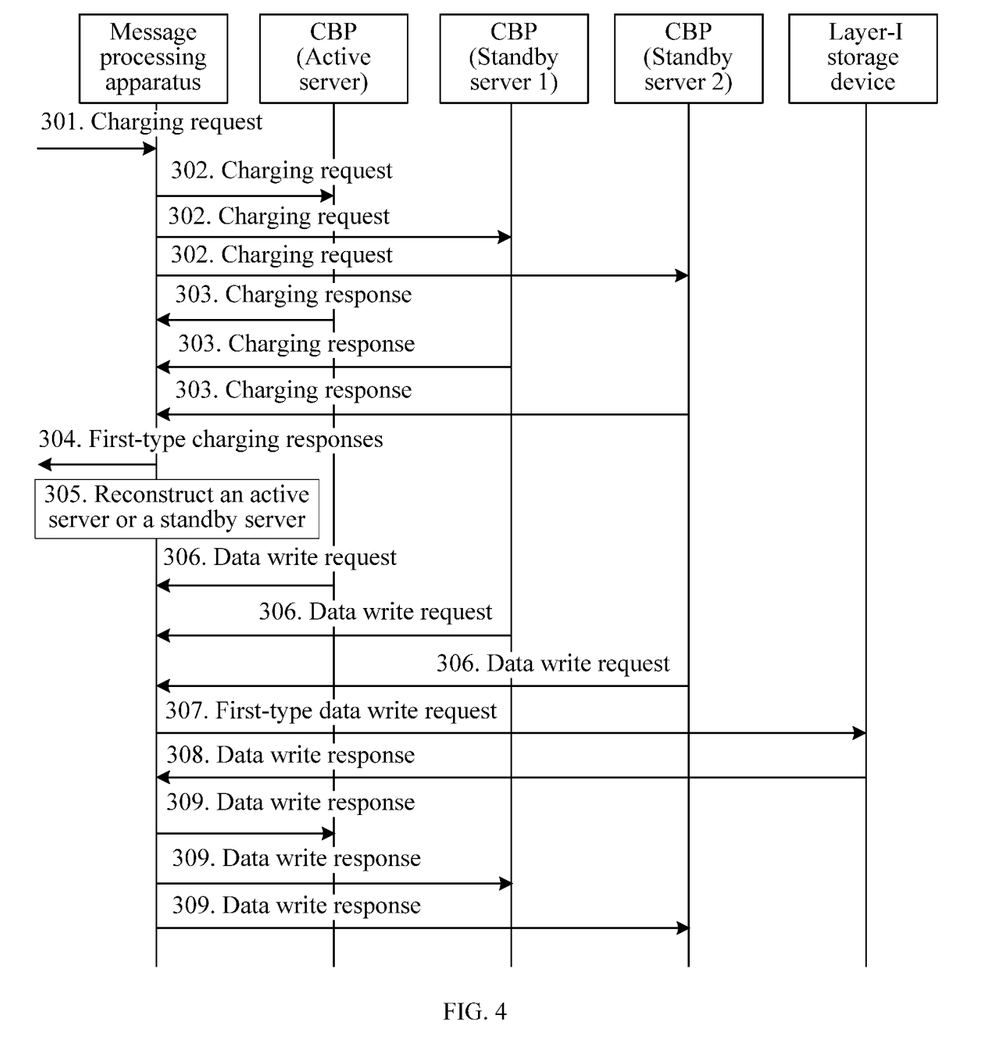
FIG. 4 is a flowchart of a message processing method according to Embodiment 3 of the present disclosure.

Referring to FIG. 4, FIG. 4 is a flowchart of a message processing method on a cloud computing platform according to Embodiment 3 of the present disclosure.

As shown in the figure, an application program such as, for example, a charging application runs in a virtualization container, and the virtualization container takes over all requests of the charging application that are used to access a resource, including a network resource, a magnetic disk resource, and a CPU resource. This embodiment provides a description by using a convergent billing part (CBP) in the charging application as an example. The virtualization container in which the charging application is located shares a storage resource. A network resource and a storage resource of the virtualization container are deployed independently. CBPs are deployed in the CBP active server and CBP standby servers 1 and 2.

After the active server and the standby server complete deployment, the message processing apparatus locally stores a routing table, so as to facilitate subsequent message sending.

Step 301: Receive an external charging request message.

A charging request received by the message processing apparatus carries a message feature, and the message feature in this embodiment may be a session-id and a charging request number. Charging request messages sequentially sent by different external devices may be distinguished by using identifiers such as, for example, user equipment (UE) identifiers of the external devices. A destination address of an external charging request message may be an active server and/or a standby server, or may be a message processing apparatus in this embodiment, and message processing apparatuses may all receive the external charging request message.

Step 302: Send the charging request message to the active server and the standby servers.

The message processing apparatus sends the charging request message to the active server and the standby servers 1 and 2 according to a local routing table.

Step 303: The active server and the standby servers process the charging request message and returns charging response messages.

The active server and the standby servers 1 and 2 independently execute charging processing according to the charging request and return charging response messages, and the message processing apparatus executes step 304.

In addition, after processing the charging request message, the active server and the standby servers 1 and 2 in this embodiment of the present disclosure also need to write data into the layer-I storage device, that is, execute step 306.

Step 304: Receive the charging response messages sent by the active server and the standby server, and send a first-type charging response message.

The message processing apparatus may identify, by means of the session-id and the request number, charging response messages returned by different virtual machines in response to a same charging request message.

In this embodiment charging results in the charging response messages returned after the active server or the standby server executes the charging request message may be different. In this case, the message processing apparatus obtains first-type charging response messages corresponding to a charging result that appears repeatedly for maximum times, and selects one of the first-type charging response messages for sending.

Step 305: Reconstruct, according to virtual machines corresponding to the first-type charging response messages, active servers or standby servers except the virtual machines corresponding to the first-type charging response messages.

The message processing apparatus reconstructs, according to the virtual machines corresponding to the first-type charging response messages, virtual machines (which may be active servers or standby servers), with the exception of the virtual machines corresponding to the first-type charging response messages, so that the active servers or standby servers with the exception of the virtual machines corresponding to the first-type charging response messages are restored, thereby improving reliability of dual-server standby.

In special cases, when output results of all the virtual machines are different, all the virtual machines are reconstructed according to a predefined virtual machine construction rule. In addition, in this embodiment of the present disclosure, when a virtual machine obviously operates abnormally (for example, cannot return a response message), the virtual machine is reconstructed, for example, the virtual machine that cannot return a response message is reconstructed according to a virtual machine corresponding to the first charging response message.

Step 306: The active server and the standby servers send a data write request to a layer-I storage device.

In this embodiment, the active server and the standby servers 1 and 2 also need to store charging information in the layer-I storage device, and send a storage access request to the layer-I storage device. In this embodiment, the message processing apparatus may intercept all storage access requests, and the storage access requests may be data write requests. During specific implementation, data in the data write requests sent by the active server and the standby servers 1 and 2 may be inconsistent.

Step 307: Receive multiple data write requests sent by the active server and the standby server, and send a first-type data write request to the layer-I storage device.

In this embodiment, a message feature in the data write request is a keyword (corresponding to different to-be-written data) in the data write request. After receiving the data write requests, the message processing apparatus identifies, by means of keywords in the data write requests, the data write requests sent by the active server and the standby servers 1 and 2 to the layer-I storage device.

In addition, the data write request carries to-be-written data. In this embodiment of the present disclosure, first-type data write requests corresponding to to-be-written data that appears repeatedly for maximum times are determined in multiple data write requests with a same keyword, and one data write request of the first-type data write requests is sent to the layer-I storage device, so as to further improve correctness of data writing.

The layer-I storage device writes charging data according to the received data write request, and returns a data write response.

Step 308: Receive a data write response returned by the layer-I storage device.

The message processing apparatus receives the data write response returned by the layer-I storage device.

Step 309: Duplicate and send the data write response to the active server and the standby servers.

After receiving the data write response corresponding to the data write request, the message processing apparatus matches a corresponding data write request according to a keyword, then sends the received data write response to the active server and the standby servers 1 and 2 according to an internally stored routing table, and completes a data write process.

Figure 5:
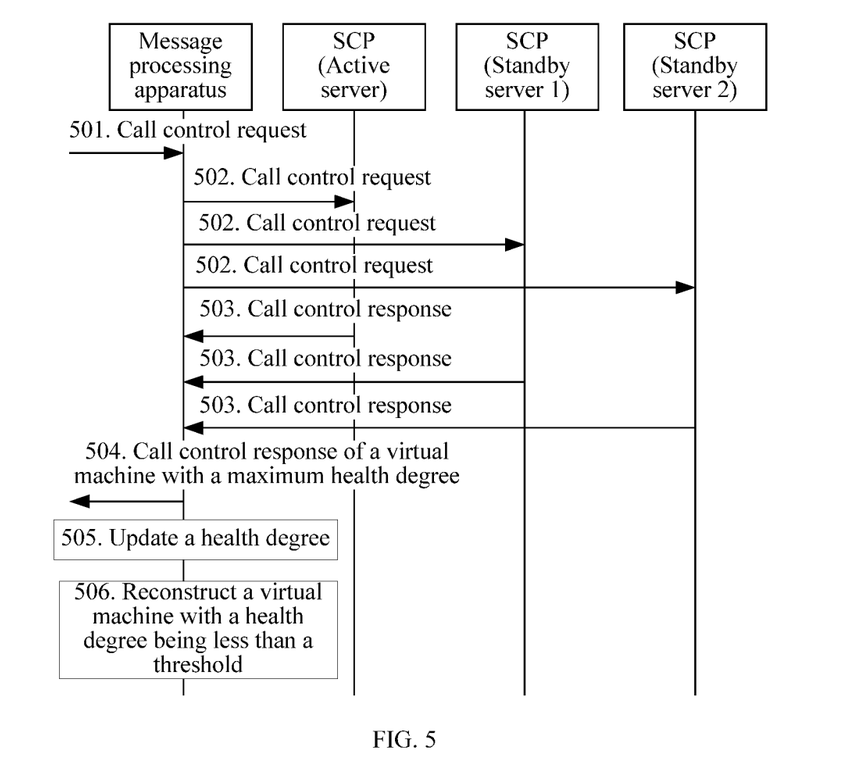
FIG. 5 is a flowchart of a message processing method according to Embodiment 4 of the present disclosure.

Referring to FIG. 5, FIG. 5 is a flowchart of a method for processing a message on a cloud computing platform according to Embodiment 4 of the present disclosure.

As shown in the figure, an application program such as, for example, a call processing application runs in a virtualization container, and the virtualization container takes over all requests of the application that are used to access a resource, including, for example, a network resource, a magnetic disk resource, and a CPU resource. This embodiment provides a description by using a service control part (SCP) in the call processing application as an example. SCPs are deployed in all of an active server and standby servers 1 and 2.

A call message processing method of an intelligent network in a dual-server standby scenario provided in this embodiment of the present disclosure mainly includes the following steps.

Step 501: Receive a call control request reported externally.

Further, a message processing apparatus receives a call control request reported by an external service switching point (SSP).

Step 502: Send the call control request to an active server and standby servers.

The message processing apparatus sends the call control request to all active servers and standby servers according to an internally stored routing table.

The active server and the standby server independently execute call control and return call control responses. A dialogue identifier (dialog id) of a transaction processing capability application part (TCAP) layer of a Customized Application for Mobile Network Enhanced Logic Application Part (CAMEL Application Part or CAP) protocol in the call control responses may uniquely identify the call request.

Step 503: Receive call control responses sent by the active server and the standby servers.

The message processing apparatus may receive call control responses returned by all the active servers and standby servers 1 and 2.

Step 504: Send a call control response returned by a virtual machine with a maximum health degree.

Further, the message processing apparatus stores health degree data of each active server and each standby server, and the health degree data is obtained by computing history call control responses, for example, the health degree data is determined according to a proportion of a quantity of correct call control responses returned to a quantity of total call control responses returned.

The message processing apparatus sends the call control response returned by the virtual machine with a maximum health degree, distinguishes duplicate call control responses according to a dialogue identifier of a TCAP layer of the CAP protocol in the call control response, and discards the duplicate call control responses, so as to complete a call control process.

Step 505: Update a health degree of the active server and a health degree of the standby server according to the received call control responses.

In this embodiment of the present disclosure, after the call control responses are sent, whether the call control responses returned by all the active servers and the standby servers currently are correct is determined. That is, quantities of times different call control results appear repeatedly in all the call control responses are counted, a call control response corresponding to a response result that appears repeatedly for maximum times is determined as a correct call control response (if the call control results in all the call control responses are different, all the call control responses are determined as wrong call control responses), call control responses corresponding to other response results are determined as wrong call control responses, and the health degree of the active server and the standby server corresponding to the call control responses is updated, so that the virtual machine with the maximum health degree is determined when the call control response is sent.

In addition, if the active server or the standby server does not return a call control response, it may be determined that the virtual machine on one or both of the active or standby servers returns a wrong call control response, and a health degree of the virtual machine is updated.

Step 506: Reconstruct an active server or a standby server with a health degree being less than a threshold.

In this embodiment, if the health degree of the active server or the health degree of the standby server is less than the threshold (such as 95%), it is determined that the virtual machine is abnormal, and the virtual machine is reconstructed. For example, the virtual machine is reconstructed according to a predefined rule, or the active server or the standby server with the health degree being less than the threshold is reconstructed according to the virtual machine with a maximum health degree.

In this embodiment of the present disclosure, by deploying multiple active servers and standby servers, the active servers and the standby servers synchronously execute a call request, and dual-server standby improves stability of a call control process. In addition, a single application program configuration in a cloud environment may be very low, and therefore, this embodiment of the present disclosure may reduce costs of telecommunication hardware by using low-cost virtual machines on a large scale.

Figure 6:
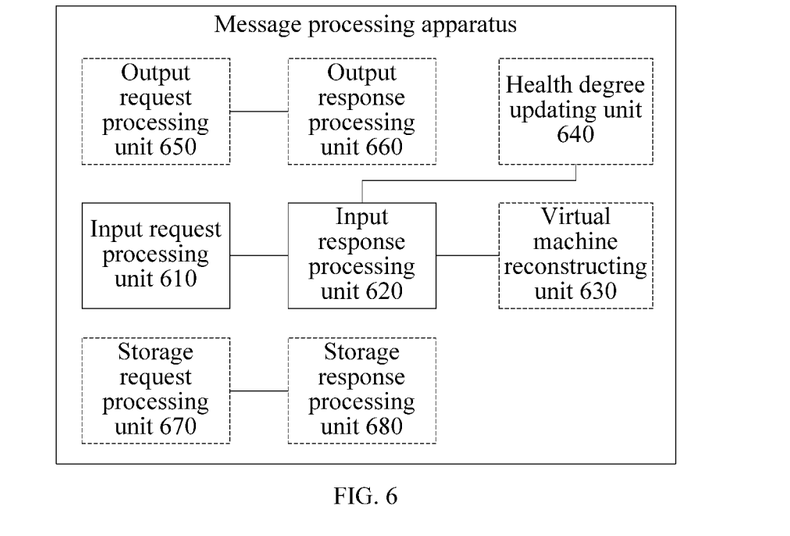
FIG. 6 is a schematic structural diagram of a message processing apparatus according to Embodiment 5 of the present disclosure.

Referring to FIG. 6, FIG. 6 is a schematic structural diagram of a message processing apparatus according to Embodiment 5 of the present disclosure.

As shown in the figure, the message processing apparatus provided in this embodiment of the present disclosure mainly includes an input request processing unit 610 configured to receive an input request message and send the request message to an active server and a standby server that are deployed on the cloud computing platform, where a same application program runs on the active server and the standby server, and the active server and the standby server are configured to implement dual-server standby; and an input response processing unit 620 configured to receive multiple input response messages returned by the active server and the standby server and send one of the input response messages.

In the message processing apparatus provided in this embodiment of the present disclosure, receiving, by the input response processing unit 620, the multiple input response messages returned by the active server and the standby server and sending one of the input response messages may include receiving, by the input response processing unit 620, the multiple input response messages returned by the active server and the standby server, and sending a response message that first arrives; or receiving, by the input response processing unit 620, the multiple input response messages returned by the active server and the standby server, where the input response messages carry response results, determining first-type input response messages corresponding to a response result that appears repeatedly for maximum times, and sending one input response message of the first-type input response messages; or receiving, by the input response processing unit 620, the multiple input response messages returned by the active server and the standby server, where the input response messages carry response results, and when the response results of the multiple input response messages are all different, selecting and sending input response messages of a predefined active server or standby server; or receiving, by the input response processing unit 620, the multiple input response messages returned by the active server and the standby server, and sending an input response message returned by a virtual machine with a maximum health degree in the active server and the standby server.

The processing process of the input response processing unit 620 is similar to the foregoing relevant description of step 102 in Embodiment 1 which was shown and described in FIG. 2.

Further referring to FIG. 6, the message processing apparatus provided in this embodiment of the present disclosure includes a virtual machine reconstructing unit 630, a health degree updating unit 640, an output request processing unit 650, an output response processing unit 660, a storage request processing unit 670, and a storage response processing unit 680. The virtual machine reconstructing unit 630 is configured to reconstruct the active server and the standby server when the response results of the multiple input response messages are abnormal, or reconstruct, when a health degree of the active server or a health degree of the standby server is less than a threshold, the active server or the standby server with the health degree being less than the threshold. Cases in which there is abnormality include the response results of the multiple input response messages are all different or response results of only some response messages of the multiple input response messages are different, that is, response results of other input response messages are the same. The process of reconstructing a virtual machine by the virtual machine reconstructing unit 630 is similar to the foregoing description of step 103 in Embodiment 1 which was shown and described in FIG. 2. A health degree updating unit 640 is configured to update the health degree of the active server and the health degree of the standby server according to the received input response messages, where the health degree of the active server and the health degree of the standby server are obtained by computing quantities of input response messages that carry correct response results and that are separately sent by the active server and the standby server. The health degree updating unit 640 may specifically obtain the health degree of the active server and the health degree of the standby server by computing a total quantity of input response messages sent by the virtual machines and input response messages that carry correct response results. An output request processing unit 650 is configured to receive multiple output request messages sent by the active server and the standby server. An output response processing unit 660 is configured to receive an output response message, and send the output response message to the active server and the standby server. The processes of processing the output request message and the output response message by the output request processing unit 650 and the output response processing unit 660 is similar to the foregoing relevant descriptions of steps 201 and 202 in Embodiment 2, which was shown and described in FIG. 2, and details are not described herein. A storage request processing unit 670 is configured to receive multiple storage access requests sent by the active server and the standby server, and send one of the storage access requests to a layer-I storage device shared by the active server and the standby server. A storage response processing unit 680 is configured to receive a storage access response returned by the layer-I storage device, and send the storage access response to the active server and the standby server. The sending, by the storage request processing unit 670, one of the storage access requests to a layer-I storage device shared by the active server and the standby server includes sending, by the storage request processing unit 670 to the layer-I storage device shared by the active server and the standby server, a storage access request that first arrives.

In this embodiment of the present disclosure, processes of processing the storage access request and the storage access response by the storage request processing unit 670 and the storage response processing unit 680 are similar to the foregoing relevant descriptions of steps 203 and 204 in Embodiment 2 that was shown and described with reference to FIG. 2, and details are not described herein. As compared with the prior art, the message processing apparatus in this embodiment of the present disclosure may enable the active server and the standby server to share a layer-I storage device, so as to reduce redundancy of storage resources in a dual-server standby scenario.

Figure 7:
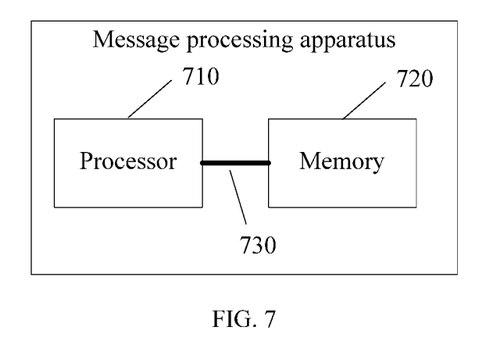
FIG. 7 is a schematic structural diagram of a message processing apparatus according to Embodiment 6 of the present disclosure.

Referring to FIG. 7, FIG. 7 is a schematic structural diagram of a message processing apparatus according to Embodiment 6 of the present disclosure.

As shown in the figure, the message processing apparatus provided in this embodiment of the present disclosure includes a processor 710, a memory 720, and a bus 730. The memory 720 is configured to store a computer execution instruction. The processor 710 and the memory 720 are connected by using the bus 730, and when the apparatus runs, the processor 710 executes the computer execution instruction, so as to enable the apparatus to execute the following method: receiving an input request message, and sending the request message to an active server and a standby server that are deployed on a cloud computing platform, where a same application program runs on the active server and the standby server; and receiving multiple input response messages returned by the active server and the standby server and sending one of the input response messages.

The process for executing the foregoing method by the message processing apparatus provided in Embodiment 6 of the present disclosure and shown in FIG. 7 is the same as an execution process in Embodiment 1, Embodiment 2, Embodiment 3, and Embodiment 4 of the foregoing corresponding message processing method, and has a same beneficial effect. For details, refer to the foregoing embodiments, and details are not described herein.

Figure 8:
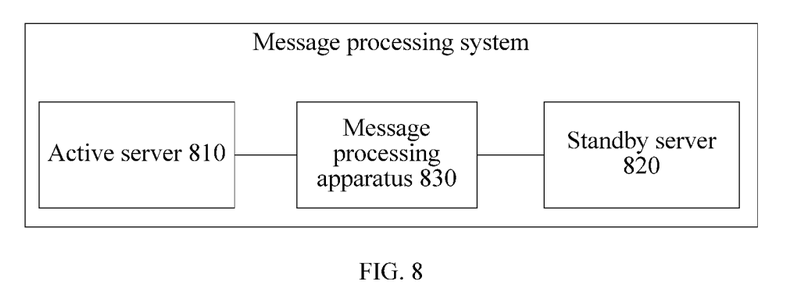
FIG. 8 is a schematic structural diagram of a message processing system according to Embodiment 7 of the present disclosure.

Referring to FIG. 8, FIG. 8 is a schematic structural diagram of a message processing system according to Embodiment 7 of the present disclosure.

As shown in the figure, the message processing system provided in this embodiment of the present disclosure mainly includes an active server 810, a standby server 820, and a message processing apparatus 830. The structure and function of the message processing apparatus 830 are the same as those of the message processing apparatus provided in the foregoing Embodiments 5 and 6. For details, refer to the foregoing embodiments, and details are not described herein. The message processing system provided in the embodiments of the present disclosure sends an input request to all active servers and standby servers for execution, and the active servers and the standby servers execute the same input request. Therefore, data synchronization and status synchronization do not need to be performed between the active servers and the standby servers, so that stability of dual-server standby is improved, and a dual-server switch speed is further improved.

A person of ordinary skill in the art may understand that, each aspect of the present disclosure or a possible implementation manner of each aspect may be specifically implemented as a system, a method, or a computer program product. Therefore, each aspect of the present disclosure or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A message processing method, comprising:
   receiving an input request message;
   sending the input request message to an active server and a standby server that are deployed on a cloud computing platform, wherein a same application program runs on the active server and the standby server;
   receiving multiple input response messages from the active server and the standby server;
   sending one of the multiple input response messages to an external device;
   receiving multiple storage access requests from the active server and the standby server; and
   sending one of the multiple storage access requests to an Infrastructure as a Service (IaaS) layer storage device shared by the active server and the standby server.

2. The method according to claim 1, wherein receiving the multiple input response messages from the active server and the standby server and sending one of the multiple input response messages comprises receiving the multiple input response messages from the active server and the standby server, and sending a response message that first arrives, the response message being one of the multiple input responses.

3. The method according to claim 1, wherein receiving the multiple input response messages from the active server and the standby server and sending one of the multiple input response messages comprises:
   receiving the multiple input response messages from the active server and the standby server, wherein the input response messages carry response results;
   determining first-type input response messages corresponding to a response result that appears repeatedly for a maximum number of times; and
   sending one input response message of the first-type input response messages.

4. The method according to claim 1, wherein receiving the multiple input response messages from the active server and the standby server and sending one of the multiple input response messages comprises:
   receiving the multiple input response messages from the active server and the standby server, wherein the multiple input response messages carry response results; and
   selecting and sending an input response message of a predefined active server or standby server when the response results of the multiple input response messages are all different.

5. The method according to claim 1, wherein receiving the multiple input response messages from the active server and the standby server and sending one of the multiple input response messages comprises:
   receiving the multiple input response messages from the active server and the standby server; and
   sending an input response message returned by a virtual machine with a maximum health degree in one of the active server or the standby server.

6. The method according to claim 1, further comprising updating a health degree of the active server and a health degree of the standby server according to the multiple input response messages, wherein the health degree of the active server and the health degree of the standby server are updated by computing quantities of each of the multiple input response messages with response results that are correct and that are separately sent by the active server and the standby server.

7. The method according to claim 6, further comprising:
   determining whether the response results of the multiple input response messages are abnormal by comparing a quantity of the response results that are correct to a total quantity of input response messages received from the active server and the standby server; and
   reconstructing the active server and the standby server when the response results of the multiple input response messages are abnormal.

8. The method according to claim 1, wherein receiving the multiple input response messages from the active server and the standby server and sending one of the multiple input response messages comprises:
   receiving the multiple input response messages from the active server and the standby server, and sending an input response message that is first returned, the input response message being one of the multiple input responses;
   identifying, according to a message feature of the input response message, a message that is a duplicate of the input response message that is first returned; and
   discarding the message.

9. The method according to claim 1, further comprising:
   receiving multiple output request messages from the active server and the standby server;
   sending one of the multiple output request messages to the external device;
   receiving an output response message from the external device;
   duplicating the output response message to generate duplicate output response messages; and
   sending the duplicate output response message to the active server and the standby server such that the active server and the standby server both execute the output response message received from the external device.

10. The method according to claim 1, wherein the method further comprises:
    receiving a storage access response from the IaaS layer storage device; and
    sending the storage access response to the active server and the standby server.

11. The method according to claim 10, wherein sending one of the storage access requests to the IaaS layer storage device shared by the active server and the standby server comprises sending a first arriving storage access request to the IaaS layer storage device shared by the active server and the standby server.

12. A message processing apparatus, comprising:
    a memory comprising instructions; and
    a processor coupled to the memory, wherein the instructions cause the processor to be configured to:
    receive an input request message; and
    send the input request message to an active server and a standby server that are deployed on a cloud computing platform, wherein the active server and the standby server are configured to implement dual-server standby, and wherein a same application program runs on the active server and the standby server;

receive multiple input response messages from the active server and the standby server and send one of the multiple input response messages to an external device;

receive multiple storage access requests from the active server and the standby server; and send one of the multiple storage access requests to an infrastructure as a (IaaS) layer storage device shared by the active server and the standby server.

13. The message processing apparatus according to claim 12, wherein the instructions further cause the processor to be configured to:

receive the multiple input response messages from the active server and the standby server and send a response message that first arrives;

receive the multiple input response messages from the active server and the standby server, wherein the multiple input response messages carry response results, determine first-type input response messages corresponding to a response result that appears repeatedly for a maximum number of times, and send one input response message of the first-type input response messages;

receive the multiple input response messages from the active server and the standby server, wherein the multiple input response messages carry response results, and when the response results of the multiple input response messages are all different, select and send an input response message of a predefined active server or standby server.

14. The message processing apparatus according to claim 13, wherein the instructions further cause the processor to be configured to:

determine whether the response results of the multiple input response messages are abnormal by comparing a quantity of the response results that are correct to a total quantity of input response messages received from the active server and the standby server; and reconstruct the active server and the standby server when the response results of the multiple input response messages are abnormal.

15. The message processing apparatus according to claim 13, wherein the instructions further cause the processor to be configured to update a health degree of the active server and a health degree of the standby server according to the input response messages, wherein the health degree of the active server and the health degree of the standby server are obtained by computing quantities of input response messages that carry correct response results and that are separately sent by the active server and the standby server.

16. The message processing apparatus according to claim 12, wherein the instructions further cause the processor to be configured to:

receive multiple output request messages from the active server and the standby server and send one of the output request messages;

receive an output response message from the external device; and send the output response message to the active server and the standby server.

17. The message processing apparatus according to claim 12, wherein the instructions further cause the processor to be configured to:

receive a storage access response from the IaaS layer storage device; and send the storage access response to the active server and the standby server.

18. The message processing apparatus according to claim 17, wherein the instructions further cause the processor to be configured to send to the IaaS layer storage device shared by the active server and the standby server, a first arriving storage access request.

19. A message processing system, comprising:

an active server and a standby server; and a cloud computing platform comprising:

a memory comprising instructions; and a processor coupled to the memory, wherein the instructions cause the processor to be configured to:

receive an input request message;

send the request message to the active server and the standby server that are deployed on the cloud computing platform, wherein the active server and the standby server are configured to implement dual-server standby, and wherein a same application program runs on the active server and the standby server;

receive multiple input response messages from the active server and the standby server;

send one of the multiple input response messages to an external device;

receive multiple storage access requests from the active server and the standby server; and send one of the multiple storage access requests to an infrastructure as a Service (IaaS) layer storage device shared by the active server and the standby server.

20. The message processing system according to claim 19, wherein the same application is one of a charging application or a call processing application, and wherein one of a convergent billing part (CBP) in the charging application or a service control part (SCP) in the call processing application is deployed in the active server and the standby server.

* * * * *

UNITED STATES PATENT AND TRADEMARK OFFICE
CERTIFICATE OF CORRECTION

PATENT NO. : 10,567,507 B2  
APPLICATION NO. : 15/481962  
DATED : February 18, 2020  
INVENTOR(S) : Jian Zhu Page 1 of 1

It is certified that error appears in the above-identified patent and that said Letters Patent is hereby corrected as shown below:

On the Title Page

Page 2, U.S. Patent Documents, 6th reference: "Abiezzi" should read "AbiEzzi"

In the Claims

Claim 12, Column 19, Line 12: "infrastructure as a (IaaS)" should read "Infrastructure as a Service (IaaS)"

Claim 13, Column 19, Lines 21 and 22: "the multiple input response" should read "the input response"

Claim 19, Column 20, Line 44: "infrastructure as a Service (IaaS)" should read "Infrastructure as a Service (IaaS)"

Signed and Sealed this  
Twelfth Day of May, 2020

Andrei Iancu  
*Director of the United States Patent and Trademark Office*